(12) United States Patent
Siddarth et al.

(10) Patent No.: US 11,934,729 B2
(45) Date of Patent: Mar. 19, 2024

(54) METHODS AND SYSTEMS FOR DIRECTLY PRINTING MULTIPLE DOCUMENTS STORED OVER MULTIPLE/DIFFERENT CLOUD LOCATIONS

(71) Applicant: XEROX CORPORATION, Norwalk, CT (US)

(72) Inventors: Jaya Siddarth, Chennai (IN); Sowjanya Mahendran, Madurai (IN); Saranya Bharathi, Chennai (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/198,536

(22) Filed: Mar. 11, 2021

(65) Prior Publication Data

US 2022/0291886 A1    Sep. 15, 2022

(51) Int. Cl.
*G06F 3/12* (2006.01)
*G06F 16/955* (2019.01)

(52) U.S. Cl.
CPC .......... *G06F 3/1272* (2013.01); *G06F 3/1204* (2013.01); *G06F 3/1287* (2013.01); *G06F 3/1289* (2013.01); *G06F 16/955* (2019.01)

(58) Field of Classification Search
None
See application file for complete search history.

(56) References Cited

U.S. PATENT DOCUMENTS

| | | | |
|---|---|---|---|
| 2004/0064200 A1* | 4/2004 | Kondo | G06F 16/955 700/20 |
| 2016/0269473 A1* | 9/2016 | Bhogal | H04L 67/22 |
| 2021/0133270 A1* | 5/2021 | Moyal | G06F 16/9566 |

FOREIGN PATENT DOCUMENTS

| | | | |
|---|---|---|---|
| CN | 102300029 A | * | 12/2011 |
| JP | 2004078554 A | * | 3/2004 |
| JP | 2005169838 A | * | 6/2005 |
| JP | 2006285840 A | * | 10/2006 |
| JP | 2015141473 A | * | 8/2015 |

* cited by examiner

*Primary Examiner* — Fan Zhang
(74) *Attorney, Agent, or Firm* — Jones Robb, PLLC

(57) ABSTRACT

The disclosure discloses methods and systems for allowing a user to print multiple documents stored over multiple and/or different cloud locations. A pre-defined file is received from a user, where the file includes multiple URLs such that each URL represents a cloud URL for accessing a document stored over that cloud location. Then, each URL is analyzed to segregate the URL into a cloud location URL and a document name. A pre-defined user-friendly view is generated based on the cloud locations, where the pre-defined view includes a common cloud URLs, corresponding document names, and print options, for user's selection. Based on the user's selection, one or more documents stored at corresponding cloud locations are printed without requiring the user to access any cloud location URL.

20 Claims, 12 Drawing Sheets

METHODS AND SYSTEMS FOR DIRECTLY PRINTING MULTIPLE DOCUMENTS STORED OVER MULTIPLE/DIFFERENT CLOUD LOCATIONS

TECHNICAL FIELD

The present disclosure relates to the field of printing, and more particularly to methods and systems for allowing a user to print multiple documents stored over multiple and/or different cloud locations.

BACKGROUND

Modern day multi-function devices provide various cloud related functionalities, allowing a user to access multiple cloud locations for printing and/or scanning. One exemplary functionality is 'print from cloud', where the user can use the multi-function device to print a document stored at a cloud location such as Google Drive™. Another example is 'scan to cloud' that allows the user to scan a document to a cloud location such as Dropbox™. In the former scenario, the user simply walks up to the multi-function device, accesses the cloud storage such as Google Drive™ via an application pre-installed on the multi-function device, logs in to his google account, selects the document to be printed, prints the document, and walks away with the printed document. In the latter scenario, the user scans the document and stores the scanned document in an appropriate folder/location in Dropbox™.

While the above functionalities provide a lot of flexibility to the user, there can be scenarios when the user wishes to print multiple documents stored over/at multiple different cloud locations. To print such documents that are stored at multiple and different cloud locations, the user is required to access each of the cloud locations one by one to print the documents. For instance, if a user wishes to take printout of two documents stored in Google Drive™ and Dropbox™, respectively, he is first required to access the cloud location Google Drive™, and print the documents stored therein. Then, he accesses the second cloud location—Dropbox™, finds his document and prints the document stored over there. Sometimes, the user may have a huge list of documents stored at various cloud locations that are to be printed and accessing each cloud location to print the required documents in a sequential manner is very time consuming. Moreover, scrolling or browsing through various folders in search of the target documents requires significant time and effort, which may frustrate the user at times.

Therefore, there is a need for improvised systems and methods that can the user to print multiple documents stored at multiple different cloud locations in an easy and time-efficient manner.

SUMMARY

According to aspects illustrated herein, a method for allowing a user to print multiple documents stored over multiple and/or different cloud locations is disclosed. The method includes receiving a pre-defined file from a user, where the file includes multiple URLs, and each URL represents a cloud URL for accessing a document stored therein. Each URL is analyzed to segregate a cloud location URL and a document name. Subsequently, a pre-defined user-friendly view is generated based on the cloud locations, where the pre-defined user-friendly view includes common cloud URLs, corresponding document names, and print options, for user's selection. Based on the user's selection, one or more documents stored at corresponding cloud locations are directly printed without requiring the user to manually access any cloud location URLs.

According to further aspects illustrated herein, a multi-function device for allowing a user to print multiple documents stored over multiple and/or different cloud locations is disclosed. The multi-function device includes a URL manager for receiving a pre-defined file from a user, where the pre-defined file includes multiple URLs such that each URL represents a cloud URL to access a document stored therein. The URL manager analyzes each URL to segregate a cloud location URL and a document name. Subsequently, the URL manager generates a pre-defined user-friendly view based on the cloud locations, where the pre-defined view includes common cloud URLs, corresponding document names, and print options, for user's selection. Based on the user's selection, a print engine directly prints one or more documents stored at corresponding cloud locations without requiring the user to access any cloud location URLs.

According to additional aspects illustrated herein, a system for handling multiple URLs is disclosed. The system includes a URL manager application running on a computing device. The URL manager receives a pre-defined file from a user, where the file includes multiple URLs, and each URL represents a cloud URL to access a document stored therein. The URL manager analyzes each URL to segregate a cloud location URL and a document name associated. Subsequently, the URL manager generates a pre-defined user-friendly view based on the cloud locations, where the pre-defined view includes common cloud URLs, corresponding document names, and print options, for user's selection. The system further includes a printer that is communicatively coupled to the computing device. Based on the user's selection, the printer directly prints one or more documents stored at corresponding cloud locations without requiring the user to access any cloud location URLs.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1A:
FIGS. 1A-1B show exemplary environments in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples than just provided below.

The term "multi-function device" refers to a single device or a combination of multiple devices, to perform one or more functions such as, but not limited to, printing, imaging, scanning, and so on. The multi-function device may include software, hardware, firmware, or a combination thereof. In the context of the current disclosure, the multi-function device allows a user to print multiple documents stored at multiple and/or different cloud locations in an easy and efficient manner. In particular, the multi-function device allows the user to print multiple documents stored at multiple and/or different cloud locations without requiring the user to access any cloud locations. For example, the user is not required to manually access any cloud location. The multi-function device processes multiple URLs and provide a user friendly view with multiple options for printing such that the user can select any option for directly printing one or more documents stored over cloud locations, without requiring him to manually access/open corresponding cloud locations.

The term "pre-defined file" refers to an input file or a document including multiple URLs, where each URL represents a cloud URL to access one or more documents stored at the corresponding cloud location. The pre-defined file may be any file such as plain text file (i.e. .txt format), MS word file (.doc format), MS Excel (.xlsx format), Extensible Markup Language file (XML format), and so on. These are few examples, but the pre-defined file can be in any format suitable to include multiple URLs. In context of the current disclosure, the pre-defined file is an input provided to the multi-function device for processing.

The term "pre-defined user-friendly view" refers to any view or format with multiple options provided to the user for directly printing any document stored over the cloud. For example, the user-friendly view may be a table that includes details such as common cloud URLs, document names stored in the common cloud location URLs, print options, and so on. The details are included such that the user can select any details (e.g., document names and/or print options) from the table to directly print a document of his choice stored over a cloud location without requiring him to access the cloud location or without requiring him to open/access the cloud URL. Here, table is one example, there can be other user-friendly formats that can be provided to the user. The pre-defined user-friendly view is an output obtained after processing the pre-defined file.

The URL included in the pre-defined file refers to a URL (Uniform Resource Locator) which is accessed by the user to access a corresponding document stored therein. The URL includes a cloud storage, a cloud location and a document name. One exemplary URL is 'www.sharepoint.com/userA/abc.pdf', where 'sharepoint' represents a cloud storage hosted by an organization in this case Microsoft, 'userA' represents a cloud location i.e., a particular folder/sub-folder in the cloud storage 'sharepoint' and 'abc.pdf' refers to a document name 'abc' along with its type/extension 'PDF'. Overall, the URL indicates that the document 'abc.pdf' is stored at a SharePoint cloud storage in the folder userA. This is just one example and the URL can be in any desired format.

The term "documents" refers to any documents stored at multiple and/or different cloud locations. The documents may be scanned documents, original documents, or a combination thereof.

The term "multiple cloud locations" refer to a folder/subfolder created in a particular cloud storage where documents are stored. The multiple cloud locations may belong to the same cloud storage, may belong to different cloud storages, or may be a combination thereof.

The term "computing device" refers to a device that a user typically uses for giving print commands and other purposes. Examples of the computing device include, but are not limited to, a personal computer, a desktop, a laptop, a mobile phone, a tablet, a Personal Digital Assistant (PDA), a smart-phone or any other device capable of data communication. In context of the present disclosure, the computing device has an application running on it that allows a user to print multiple documents stored at multiple and/or different cloud locations. The computing device processes multiple URLs and provide a user friendly view with multiple options for printing such that the user can select any option for directly printing one or more documents stored over cloud locations, without requiring him to manually access/open corresponding cloud locations.

Overview

Typically, when a user wishes to print multiple documents stored at multiple and/or different cloud locations, the user has to access each cloud location and then print the required documents. In such a scenario, the user has to spend significant time and effort in accessing the cloud locations and printing the documents one by one. As a result, the approach is not efficient and user-friendly. To address such problems, the present disclosure is provided.

The present disclosure discloses methods and systems that provide a user friendly-view with multiple options for printing for selection, allowing a user to print multiple documents stored at multiple and/or different cloud locations without requiring him to manually access any URL. The methods and systems receive multiple cloud-based URLs in a pre-defined file and process these URLs to provide a user-friendly output/view. The user-friendly output includes details (such as common cloud URLs, document names, and print options) in a format such that the user can access the details (such as document names and/or print options) and print the required documents that are stored over corresponding cloud locations. The user-friendly output includes options such that the user can print specific documents stored over one or more particular cloud locations or can print all documents stored across all cloud locations. This way, the present disclosure allows the user to directly print one or more documents of his choice without the need to access any URLs/cloud locations.

Exemplary Environment

FIG. 1 shows an exemplary environment 100 in which various embodiments of the disclosure can be practiced. The environment 100 includes a multi-function device 102 for performing one or more functions such as printing, copying, scanning, faxing, and so on. In place of the multi-function device 102, the environment 100 may include a printer, a multi-function peripheral device, a multi-function printer or any device with printing capabilities.

In context of the present disclosure, the multi-function device 102 processes multiple cloud URLs (Uniform Resource Locators) and provides an output with various options to a user such that the user can directly select any option and print any documents stored over the corresponding cloud locations without requiring him to access or open the cloud locations. Thereby, the multi-function device 102 allows the user to directly print documents stored at multiple cloud locations. To accomplish this, the user submits a pre-defined file at the multi-function device 102. The pre-defined file can be a plain text file (i.e. .txt file) including multiple URLs. Each URL represents a cloud URL which is typically accessed by the user to access a document stored at the corresponding cloud location. The URLs may belong to the same cloud storage space or may belong to a different cloud storage space. Once the pre-defined file is submitted, the multi-function device 102 analyzes each URL and segregates the URL into a cloud location URL and a document name. Once all the URLs are analyzed and segregated, the multi-function device 102 generates and further displays a pre-defined user-friendly view to the user via a user interface of the multi-function device 102. The pre-defined user-friendly view includes details/options such as common cloud location URLs, document details (such as document names) stored over the common cloud URLs, and one or more print options, for user's selection. The user can directly select any of the displayed options to print documents stored over cloud locations. For example, the user selects document names to print specific documents. In another example, the user can select any print options as provided, more details will be discussed below. This way, the user can directly make selection through the user-friendly view to print documents stored over multiple/different cloud locations through a single selection or click and the user is not required to access any of the cloud location URLs.

Figure 1B:
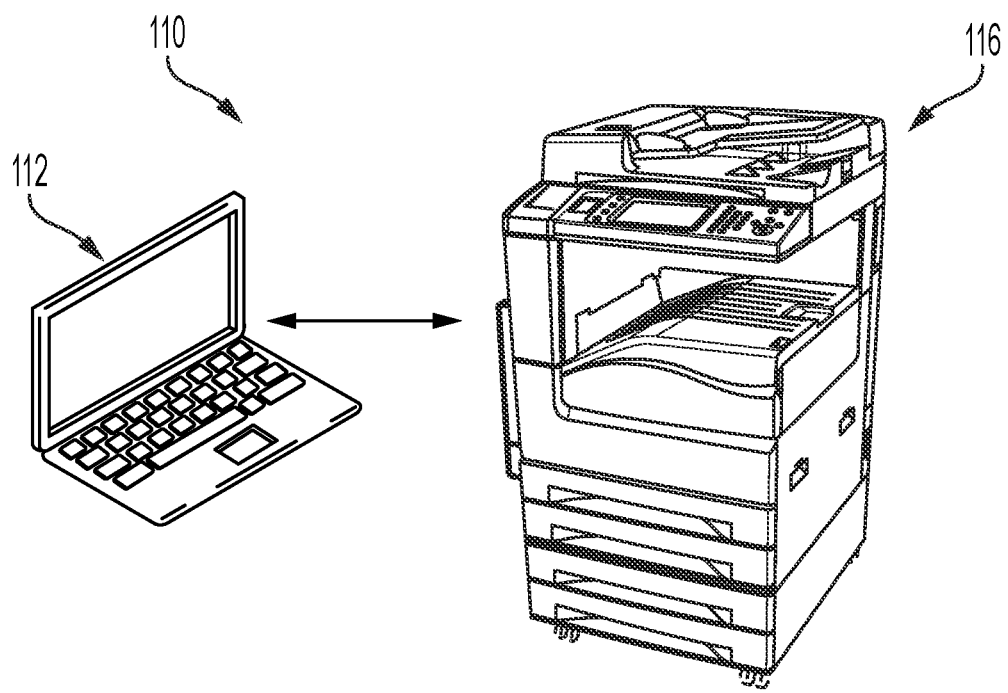

FIG. 1B shows another exemplary environment 110 in which various embodiments of the disclosure can be practiced. The environment 110 includes a computing device 112 that is communicatively coupled to a multi-function device 116. A user uses the computing device 112 for his day-to-day tasks such as chatting, emailing, surfing, submitting documents for printing, or the like. Various examples of the computing device 112 may be a laptop, a personal computer, a mobile device, a personal digital assistant or any known or later developed computing device.

In implementation, a user submits a pre-defined file to the computing device 112, where the file includes multiple URLs to access the documents that are stored at corresponding cloud locations. Once the pre-defined file is submitted, the computing device 112 analyzes the file to segregate each URL into a cloud location URL and a document name. Once all the URLs are analyzed and segregated into corresponding cloud location URLs and document names, the computing device 112 generates and displays a pre-defined user-friendly view to the user via a user interface. The pre-defined view includes details such as common cloud location URLs, document details (such as document names) stored over the common cloud URLs, and one or more print options, for user's selection. The user can select one or more document names and print options for printing the documents. This way, the user can print multiple documents stored at multiple and/or different cloud locations at the same time without needing the user to access the cloud location URLs.

In the environment of FIG. 1A, the multi-function device 102 processes all URLs and presents a pre-defined user-friendly view to the user for selection. Here, the multi-function device 102 allows the user to directly select and print the document(s) at the multi-function device 102 itself. Here, the multi-function device 102 prints the document(s) stored over particular cloud location(s) based on the user's selection. While in FIG. 1B, the computing device 112 processes all URLs and presents a pre-defined user-friendly view to the user for selection. Here, the user does selection through the computing device 112 and the multi-function device 116 which is communicatively coupled to the computing device 112 prints the documents based on the user's selection. Based on the user's selection, the computing device 112 automatically retrieves the corresponding documents from the cloud locations and sends the retrieved documents to the multi-function device 116 for printing.

Exemplary Block Diagrams

Figure 2A:
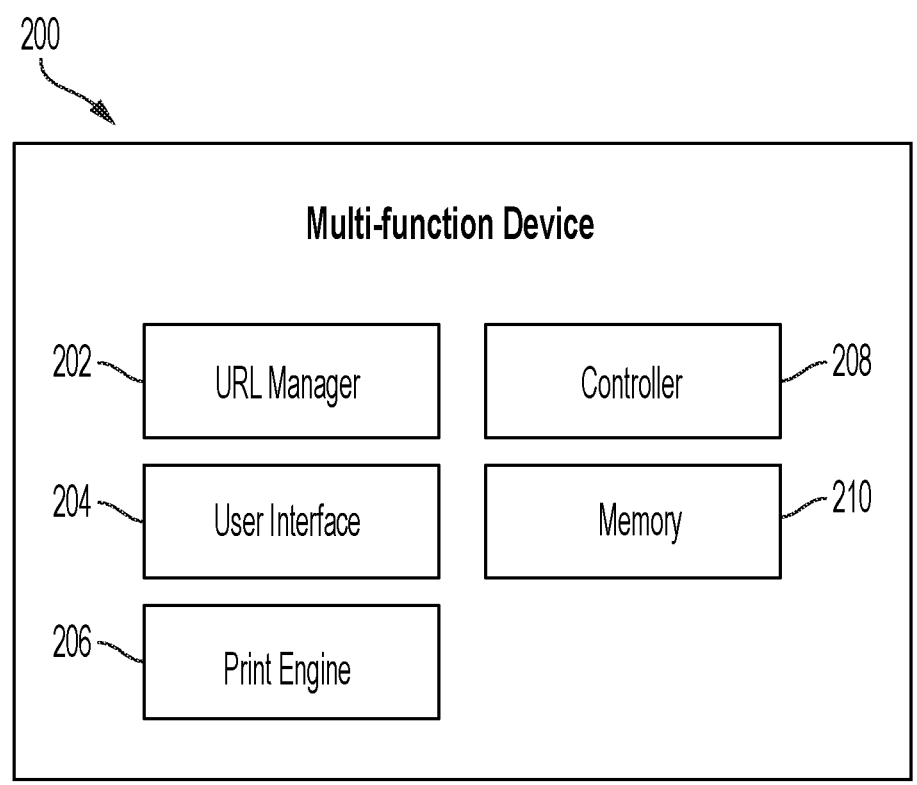
FIG. 2A is a block diagram illustrating various components of a multi-function device, in accordance with an embodiment of the present disclosure.

FIG. 2A illustrates a block diagram of a multi-function device 200 for implementing the current disclosure. As illustrated, the multi-function device 200 includes a URL manager 202, a user interface 204, a print engine 206, a controller 208, and a memory 210. The components 202-210 are connected to each other via a conventional bus or a later developed protocol. The components 202-210 communicate with each other to perform various functionalities including, but not limited to, printing, scanning, faxing, imaging, and so on. In the context of the current disclosure, the components 202-210 communicate with each other to print multiple documents stored at multiple and/or different cloud locations. The multi-function device 200 may further include additional component(s) as required to implement the present disclosure.

In operation, a user submits a pre-defined file at the multi-function device 200. The pre-defined file includes multiple URLs (i.e., Uniform Resource Locators) such that each URL represents a cloud URL to access a document stored at corresponding cloud location. An exemplary URL can be 'www.sharepoint.com/userA/abc.pdf', which indicates that a document 'abc.pdf' is stored in a SharePoint cloud storage under a folder 'userA'. Similar to this, the pre-defined file can include multiple cloud URLs to access multiple other documents stored in respective cloud storages. Exemplary cloud storages where one or more documents may be stored include Google Drive™, Amazon Drive™, Dropbox™, OneDrive™, and so on.

The pre-defined file may be any file such as a text file (i.e. .txt file), a rich text file (i.e. .rtf file), or other suitable file formats as known or later developed may be used. The pre-defined file is submitted as an input to the multi-function device 200 for further processing, specifically by the URL manager 202.

Once the pre-defined file is submitted by the user, the URL manager 202 receives the pre-defined file and stores the file temporarily in the memory 210. The pre-defined file can be stored in any local or remote temporary locations including, but not limited to, cloud server, local server, and so on.

Subsequently, the URL manager 202 processes the pre-defined file. In particular, the URL manager 202 analyzes each URL included in the pre-defined file to segregate each URL into a cloud location URL and a document name. For example, if a URL included in the pre-defined file is— www.drive.google.com/Confidential/health.docx, the URL manager 202 analyzes the URL to first identify a cloud storage, which is Google Drive™ in this case. Subsequently, the URL manager 202 segregates the URL into a cloud location URL and a document name, where the cloud location URL represents a path to a folder/sub-folder created on the cloud storage and the document name represents the document stored at the cloud location. In this particular case, the cloud location URL is www.drive.google.com/Confidential and the document name is 'health.docx'. Here, 'Confidential' represents a cloud location i.e., a particular folder/sub-folder created on Google Drive™ and 'health.docx' represents the document name 'health' with its type/extension 'docx'. Here, the URL indicates that the document 'health.docx' is stored in the Google Drive™ cloud storage location under the folder name 'Confidential'.

Similar to the above, the URL manager 202 segregates all cloud URLs included in the predefined file into respective cloud location URLs and document names. For instance, if a pre-defined file submitted to the multi-function device 200 includes 3 URLs including a first URL as www.sharepoint.com/userA/confidential/IDF.pdf, a second URL as www.sharepoint.com/userA/disclosure.pdf, and a third URL as www.dropbox.com/userB/document.pdf. the URL manager 202 analyzes the first URL and segregates the URL into a first cloud location URL www.sharepoint.com/userA/confidential and a first document name 'IDF.pdf'. Similarly, the URL manager 202 segregates the second URL into a second cloud location URL www.sharepoint.com/userA and a second document name 'disclosure.pdf', and the third URL into a third cloud location URL www.dropbox.com/userB and a third document name 'document.pdf'.

Once all the URLs are analyzed and segregated into respective cloud location URLs and document names, the URL manager 202 identifies common cloud location URLs. In the example above, www.sharepoint.com/userA represents the common cloud location URL. Based on the common cloud location URL, the URL manager 202 generates a pre-defined user-friendly view. The pre-defined user-friendly view is generated to include common cloud location URLs, corresponding document names stored at respective cloud locations, and various print options, for user's selection. The print options further include print all options and print options provided corresponding to each common cloud location URL. The pre-defined user-friendly view is then displayed to the user via the user interface 204 for his selection. The user can select document names and print options for directly printing documents stored over multiple/different cloud locations. For example, the selection of a single document name allows the user to print the specific document. In another example, the selection of a print option provided corresponding to a particular cloud location allows the user to print one or more documents stored at the corresponding cloud location. In further example, the selection of the 'print all' option allows the user to print all the documents stored at multiple and/different cloud locations. The use-friendly view may be in the form of a table or other exemplary formats as known or later developed, may be implemented. The user-friendly view may include details in a pre-defined order.

For instance, if the table displays a total of 2 common cloud location URLs such that the first cloud location URL includes 2 documents, the second cloud location URL includes 1 document, the user can select any combination of document names and corresponding print options for printing. The table also provides an option such that the user can select and print all the 3 documents by selecting the 'print all' option. More details related to the pre-defined user-friendly view and the available print options will be discussed below in FIGS. 3A-3G.

Based on the user's selection, the URL manager 202 retrieves the selected documents from the corresponding cloud locations and stores the retrieved document temporarily in the memory 210. The URL manager 202 automatically accesses the corresponding cloud locations and searches for the documents based on the document names. The URL manager 202 then downloads and stores the documents from the cloud location to the temporary location in the multi-function device 200 or in the memory 210. The URL manager 202 then sends the downloaded document to the controller 208 for printing. The controller 208 then communicates with the print engine 206 for printing the documents. The print engine 206 then prints the documents based on instructions from the controller 208. This way, the multi-function device 200 allows the user to directly print the documents stored at multiple and/or different cloud locations, without the need to manually visit/access the cloud locations/URLs for printing.

The user interface 204 presents or displays the user friendly view to the user and further allows the user to any selection for printing. For example, the user can select any displayed option such as document name, print all, print option provided for each common cloud location URL through the user interface 204.

The memory 210 stores all required details for implementing the disclosure. For example, the memory 210 may store details such as pre-defined file, downloaded documents from the respective cloud locations and so on. The memory 210 may store other relevant details as required for implementing the current disclosure.

As per FIG. 2A, the disclosure is implemented at the multi-function device 200 i.e., processing of URLs as well as printing of retrieved documents is performed at the multi-function device 200. But the disclosure can be implemented with a computing device communicatively coupled to the multi-function device such that the processing of URLs and retrieval of documents is performed at the computing device, and the retrieved documents are sent to the connected multi-function device for printing. The multi-function device then prints the documents received from the computing device. This implementation is discussed in conjunction with FIG. 2B.

Figure 2B:
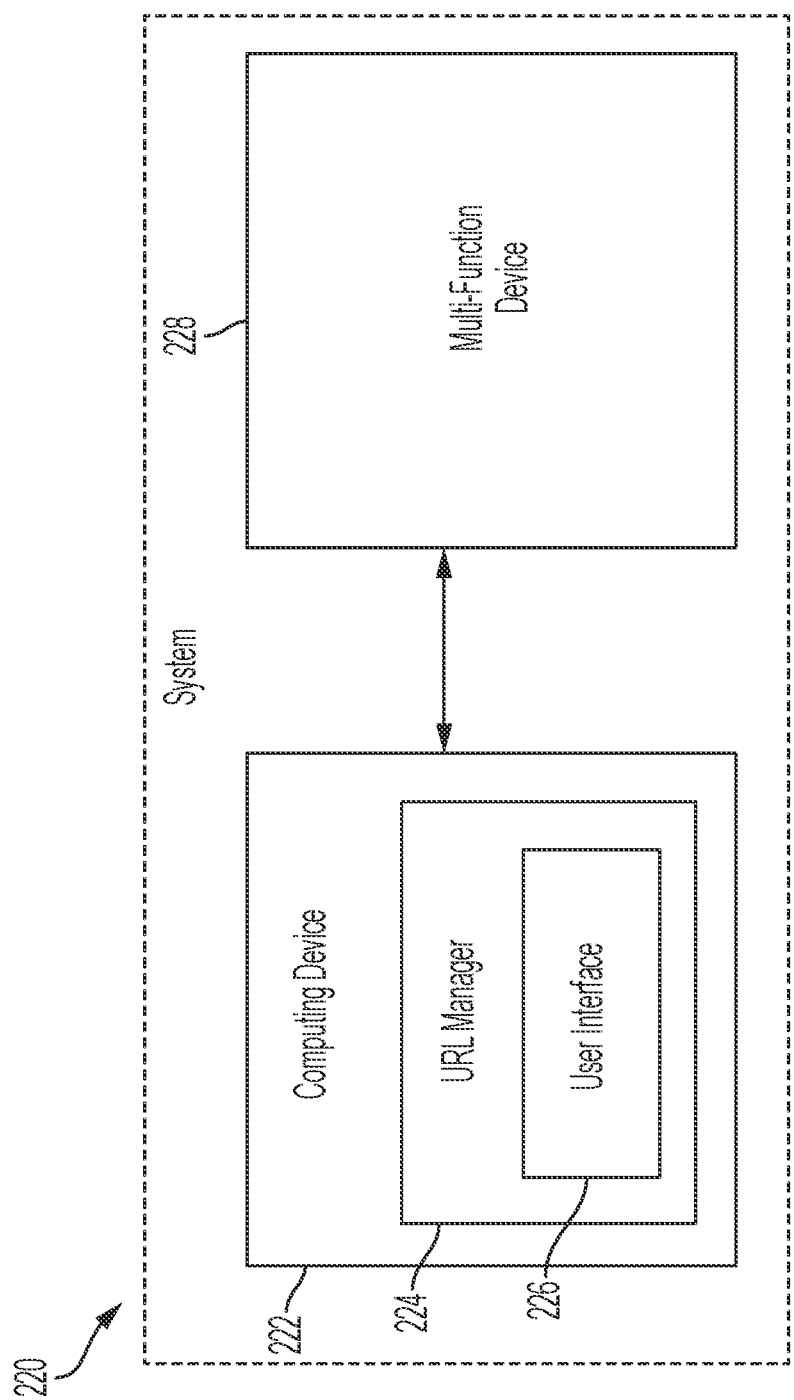
FIG. 2B shows a system including a computing device and a multi-function device, in accordance with an embodiment of the current disclosure.

As shown, FIG. 2B includes a computing device 222 communicatively coupled to a multi-function device 228. The computing device 222 and the multi-function device 228 forms a system 220. The computing device 222 further includes an application such as URL manager 224 including a user interface 226. The user submits a pre-defined file having multiple URLs to the computing device 222 which is received by the URL manager 224. The URL manager 224 receives the pre-defined file for further processing. More specifically, the URL manager 224 analyzes the pre-defined file to analyze and segregate each URL into corresponding cloud location URL and document name. For example, if the pre-defined file includes a URL—www.dropbox.com/Clientdata/inputfile.docx, the URL manager 224 segregates the URL into a cloud location URL www.dropbox.com/Clientdata and a document name 'inputfile.docx'. The URL manager 224 stores all URLs in a temporary location such as a memory of the computing device 222, a remote server, and so on.

Once all the URLs are analyzed and segregated into respective cloud location URLs and document names, the URL manager 224 identifies a list of common cloud location URLs and the corresponding document names. Subsequently, the URL manager 224 generates and displays a pre-defined user-friendly table via the user interface 226. The pre-defined user-friendly table includes common cloud URLs along with the corresponding document names and print options to print one or more documents stored at respective cloud locations.

Based on the user's selection, the URL manager 224 accesses the cloud locations, retrieves the documents and downloads on the computing device 222 temporarily. The URL manager 224 then sends the documents to the connected multi-function device 228 for printing. Upon receiving, the multi-function device 228 prints the documents.

The user interface 226 presents or displays the user friendly view to the user and further allows the user to any selection for printing. For example, the user can select any displayed option such as document name, print all, print option provided for each common cloud location URL through the user interface 226.

Exemplary Snapshots

Figure 3A:
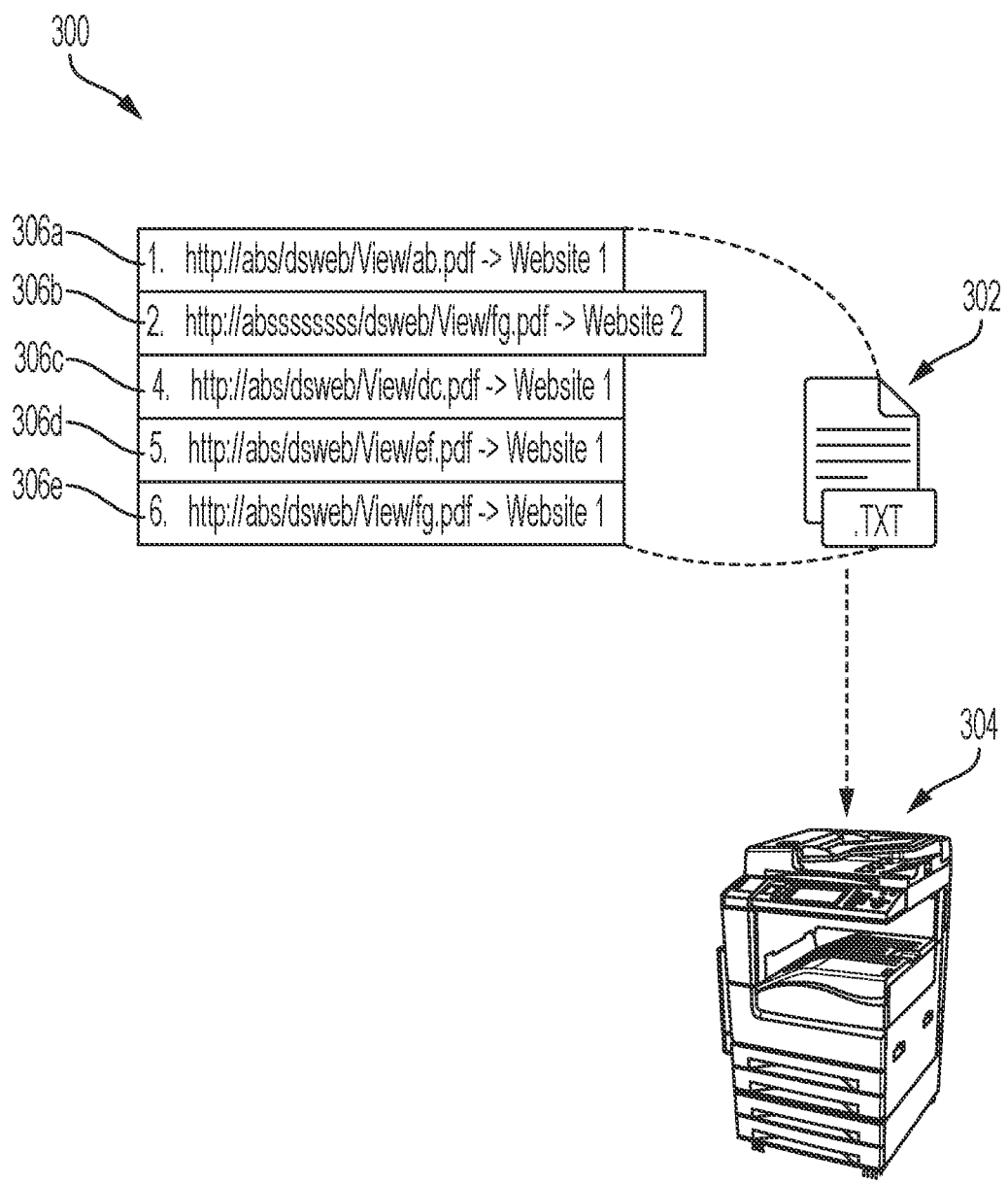
FIGS. 3A-3G show exemplary snapshots of the present disclosure.
Figure 3B:
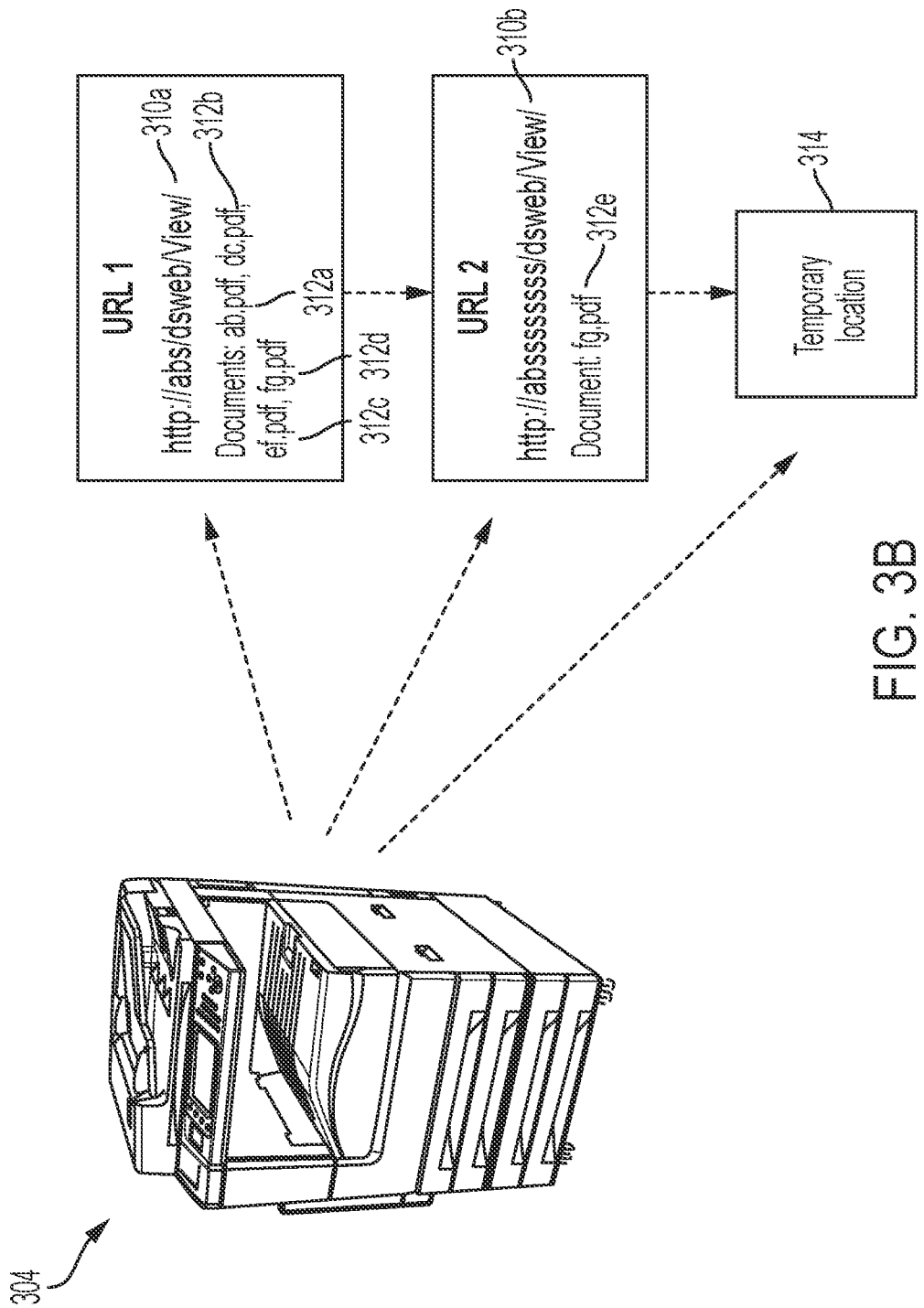

FIGS. 3A-3G represent exemplary snapshots of the present disclosure. FIG. 3A is an exemplary implementation 300 where a user wishes to print multiple documents stored at multiple different cloud locations at the same time. The implementation 300 allows the user to choose multiple documents and provide a single print command to print the documents. As shown in the snapshot 300 of FIG. 3A, the user submits a text file 302 (i.e. .txt file) at a multi-function device 304. The text file 302 includes multiple cloud URLs such as 306a, 306b, 306c, 306d, 306e (collectively 306). The multi-function device 304 processes the text file 302, specifically the cloud URLs 306 and identifies common cloud location URLs. Of the 5 URLs, the multi-function device 304 identifies 2 common cloud location URLs, marked as 310a and 310b in FIG. 3B. As clearly shown, the URLs 306a, 306c, 306d, and 306e have a common cloud location URL i.e., http://abs/dsweb/View, thus 310a is the first common cloud location URL, i.e., http://abs/dsweb/View, the URL 306b is the second common cloud location URL: http://absssssss/dsweb/View. This way, the multi-function device 304 identifies the common cloud URLs, as URLs 310a and 310b. In the current example, the multi-function device 304 identifies two common cloud location URLs as 310a and 310b.

Figure 3C:
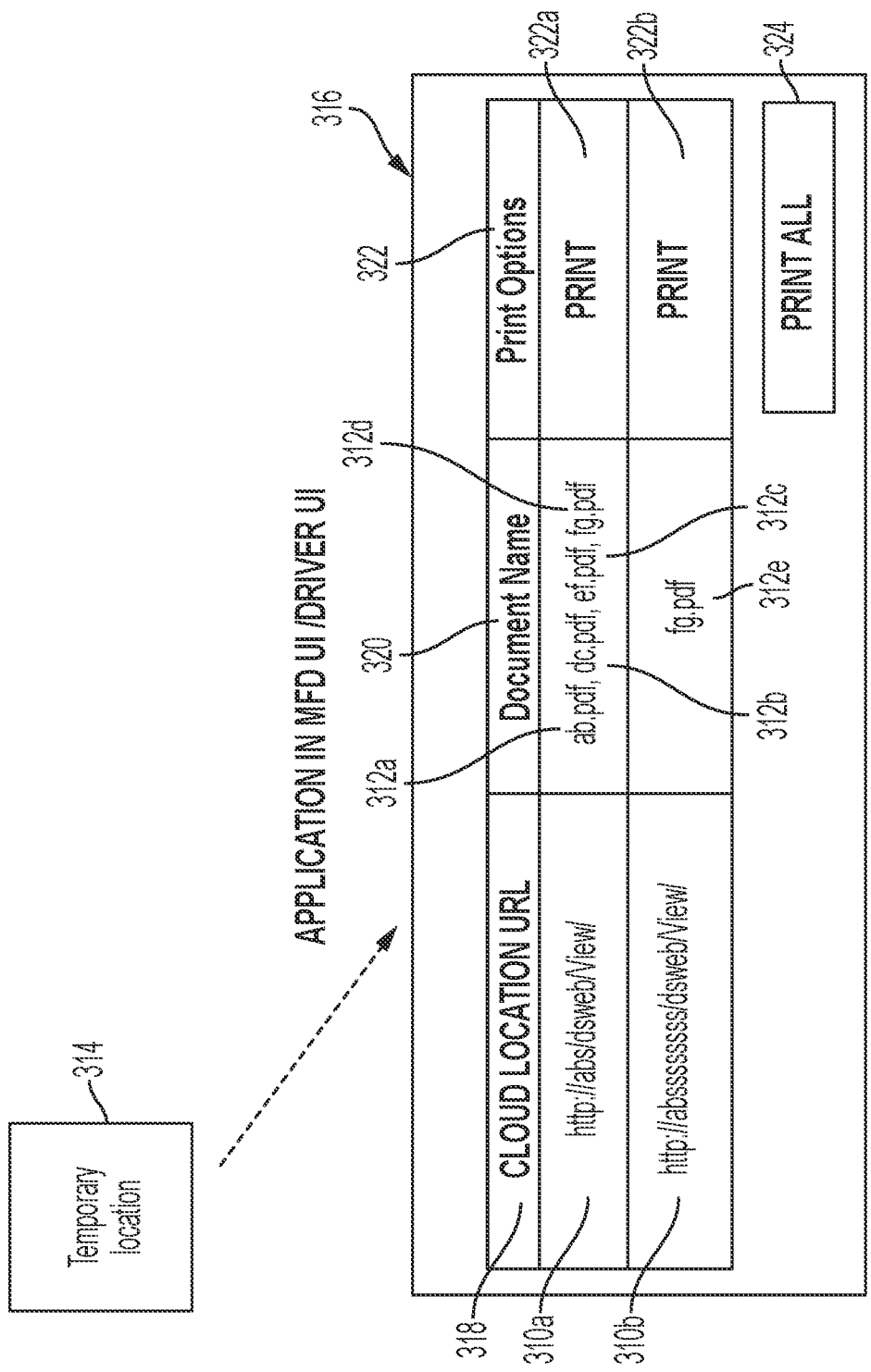

Then documents/document names associated with the common cloud location URLs 310a and 310b are identified. For example, the documents such as ab.pdf (marked as 312a), dc.pdf (marked as 312b), ef.pdf (marked as 312c), fg.pdf (marked as 312d) are associated with the common cloud location URL 310. The document associated with the second common cloud location URL 310b is a single document fg.pdf (marked as 312e). The multi-function device 304 stores all details including the common cloud location URLs 310, document names 312, etc. in a temporary location 314. This temporary location 314 can be the memory of the multi-function device 304. Once the common cloud location URLs and the documents to be associated with the common cloud location URLs is complete, the multi-function device 304 generates a pre-defined user-friendly view to include all details such as common cloud location URLs, document names, and print options. The pre-defined user-friendly view is then presented or displayed to the user via a user interface of the multi-function device 304. The pre-defined user-friendly view may be a table 316 as shown in FIG. 3C.

As clearly shown, the table 316 includes three columns titled as 'Cloud Location URL' 318, 'Document Name' 320, and 'Print Options' 322. The column 'Cloud Location URL' 318 includes common cloud URLs such as 310a and 310b that are identified based on analysis of all the cloud URLs. The column 'Document Name' 320 includes all document names stored at corresponding common cloud URLs. For example, the documents ab.pdf 312a, dc.pdf 312b, ef.pdf 312c, and fg.pdf 312d are shown corresponding the first common cloud URL 310a and the document fg.pdf 312e is shown corresponding the second cloud location URL 310b. The last column 'Print Option' 322 includes print options such as 322a, and 322b. The table 316 further includes a print option such as 'PRINT ALL' (marked as 324). The print option 322a allows the user to print all documents such as 312a, 312b, 312c, and 312d stored over the identified common cloud location URL 310a. The print option 322b allows the user to print document such as 312e stored over the second identified common cloud location URL 310b. The print All option 324 allows the user to print all documents stored over all the cloud location URLs 306 or the common cloud locations URLs 310a and 310b which are derived from the user submitted cloud URLs 306a, 306b, 306c, 306d, and 306e. The table 316 includes is shown to include details in a pre-defined order such as 318, 320 and 322. But the table 316 may include columns 318, 320 and 322 in any pre-defined order without limiting the scope of the disclosure. Further, the table 316 may include any more columns for implementing the current disclosure. The table 316 is just one example and the columns 318, 320 and 322 and/or options 312a, 312b, 312c, 312d, 312e, 322a, 322b and 324 can be presented in any suitable order such that the user can directly select and print the required documents.

Figure 3D:
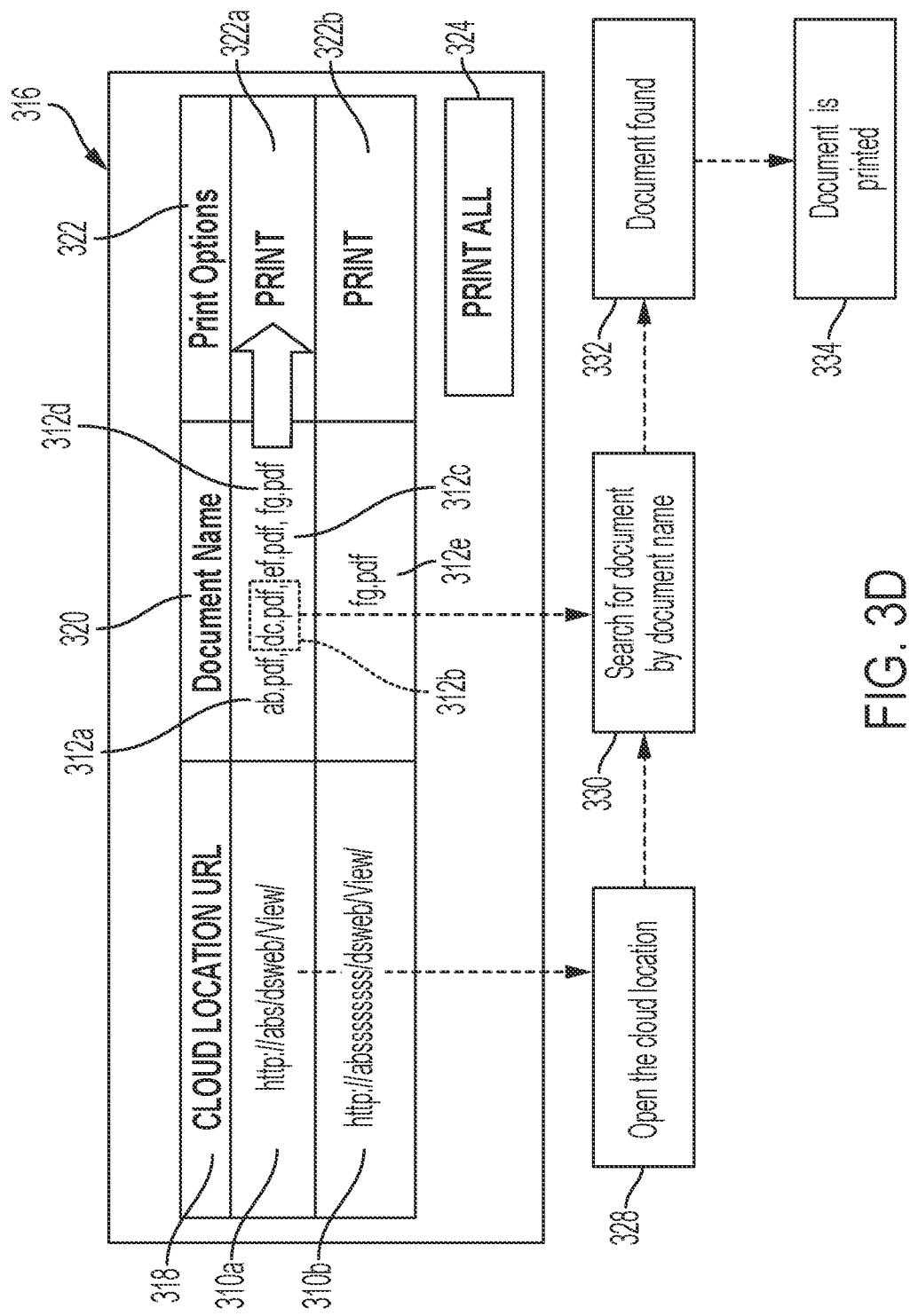

The user can directly select any document names such as 312a, 312b, 312c, 312d and 312e. The user can select print options 322a, 322b or 324. As shown in the snapshot of FIG. 3D, the user selects the document such as 312b. Upon selection of the document name dc.pdf 312b, the multi-function device 304 automatically opens the cloud location URL 310a, (block 328), searches for the document 312b by the document name dc.pdf (block 330), finds the document (block 332) and finally the document is printed (block 334) at multi-function device 304.

Figure 3E:
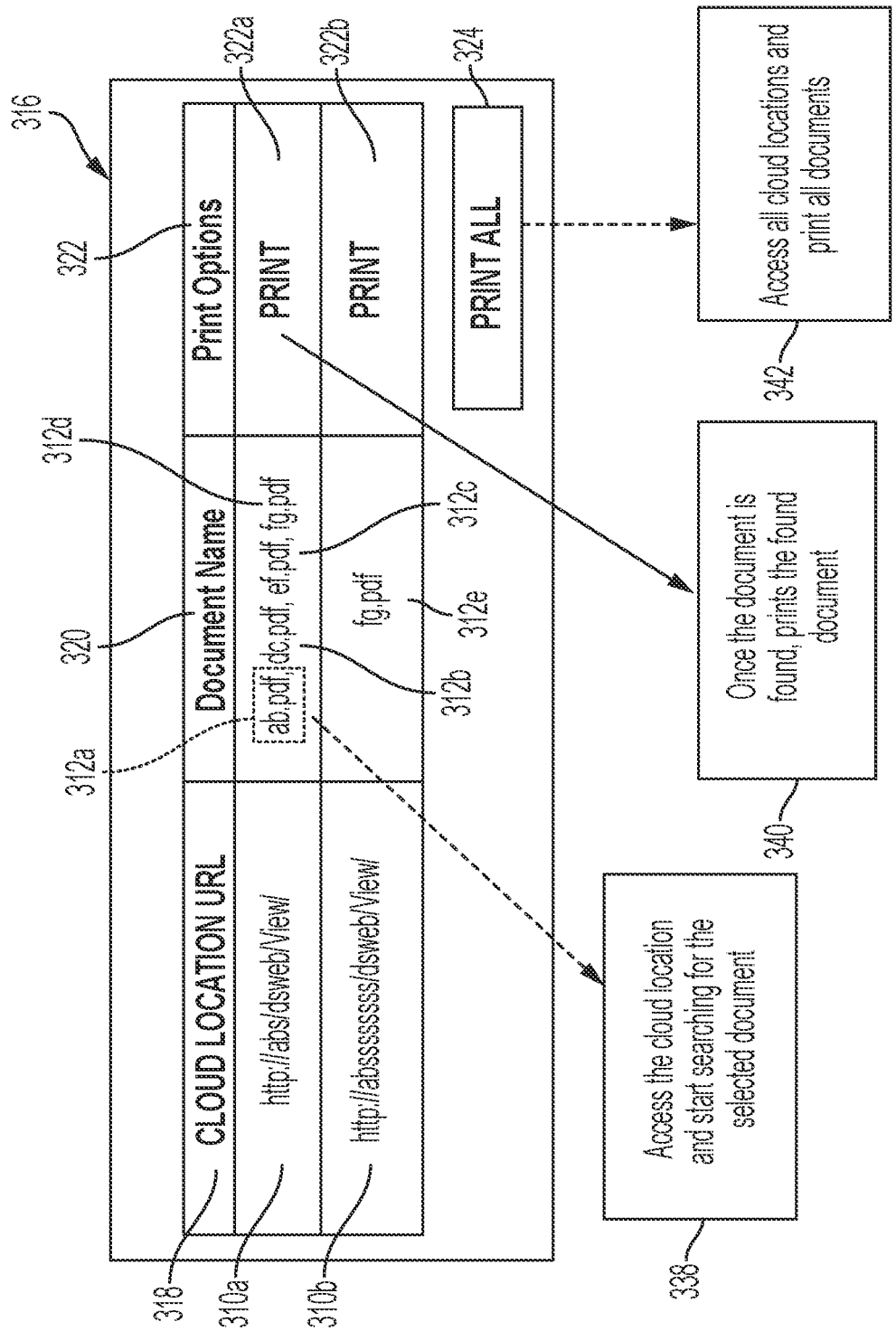

Similarly, as shown in FIG. 3E, the user selects the document name ab.pdf 312a. Upon selection, the multi-function device 304 accesses the cloud location and starts searching for the selected document based on the document name (marked as 338), finds the document and prints the found document (marked as 340). Similarly, the user can select the option 'print all' 324 that prints all documents 312a, 312b, 312c, 312d, and 312e (block 342) stored over multiple and/or different cloud locations. This way, the multi-function device 304 processes all URLs and provides a simple to the user for printing any documents stored over multiple and/or different cloud location without requiring the user to access or open any URL/cloud location.

Figure 3F:
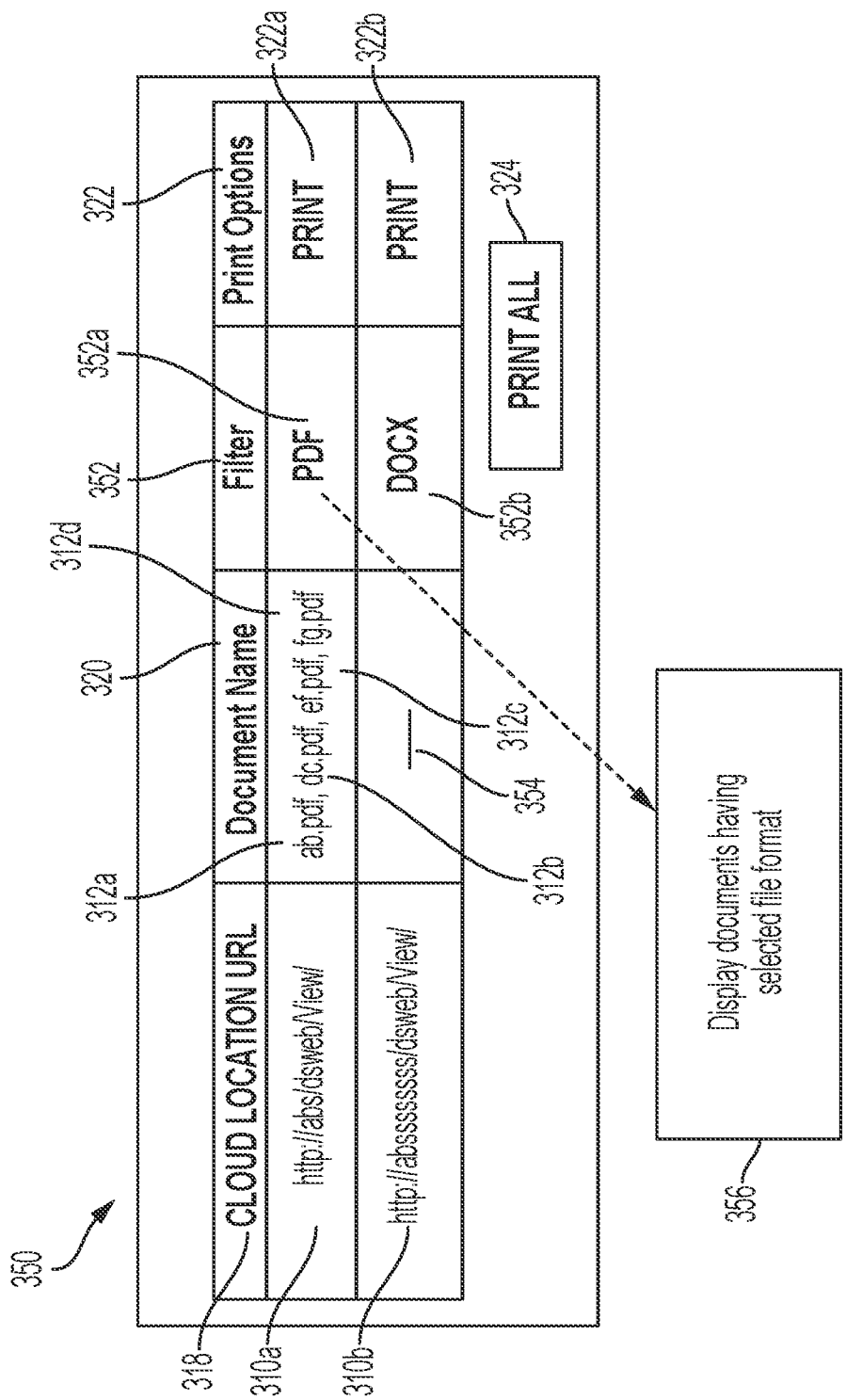

Another exemplary table such as 350 is shown in FIG. 3F. The table 350 includes an additional column such as filter (marked as 352). The column filter 352 includes details related to type of the document whether the document is PDF, DOC, DOCX and so on. The feature 352 sorts the document names by file types and further allows the user to select the document names having a specific file format. Exemplary filter options include PDF 352a (i.e., Portable Document Format) and DOCX 352b (i.e., Microsoft Word format). As shown, if the user applies the filter option PDF 352a, all documents having the selected file type is displayed to the user (block 356)

Figure 3G:
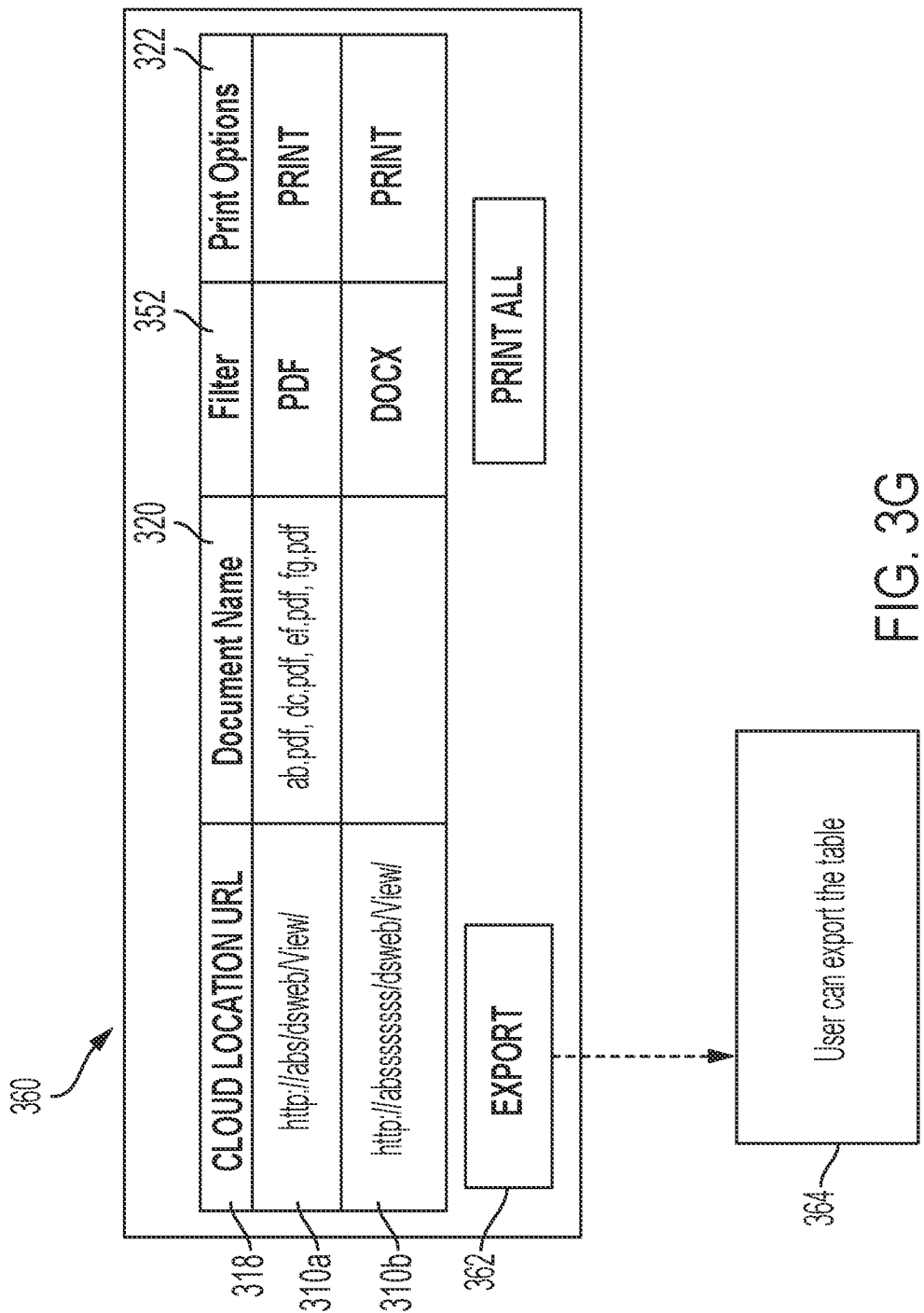

An additional exemplary table such as 360 is shown in FIG. 3G. The table 360 is an additional option such as export 362 along with the options as discussed above. The option export 362 allows the user to download the pre-defined user-friendly table 360 and the details displayed in the table 360 for later use. For example, the user can export the pre-defined user-friendly table 360 (block 364) in any format such as MS Excel, other known or later developed formats.

Exemplary Method Flowchart

Figure 4:
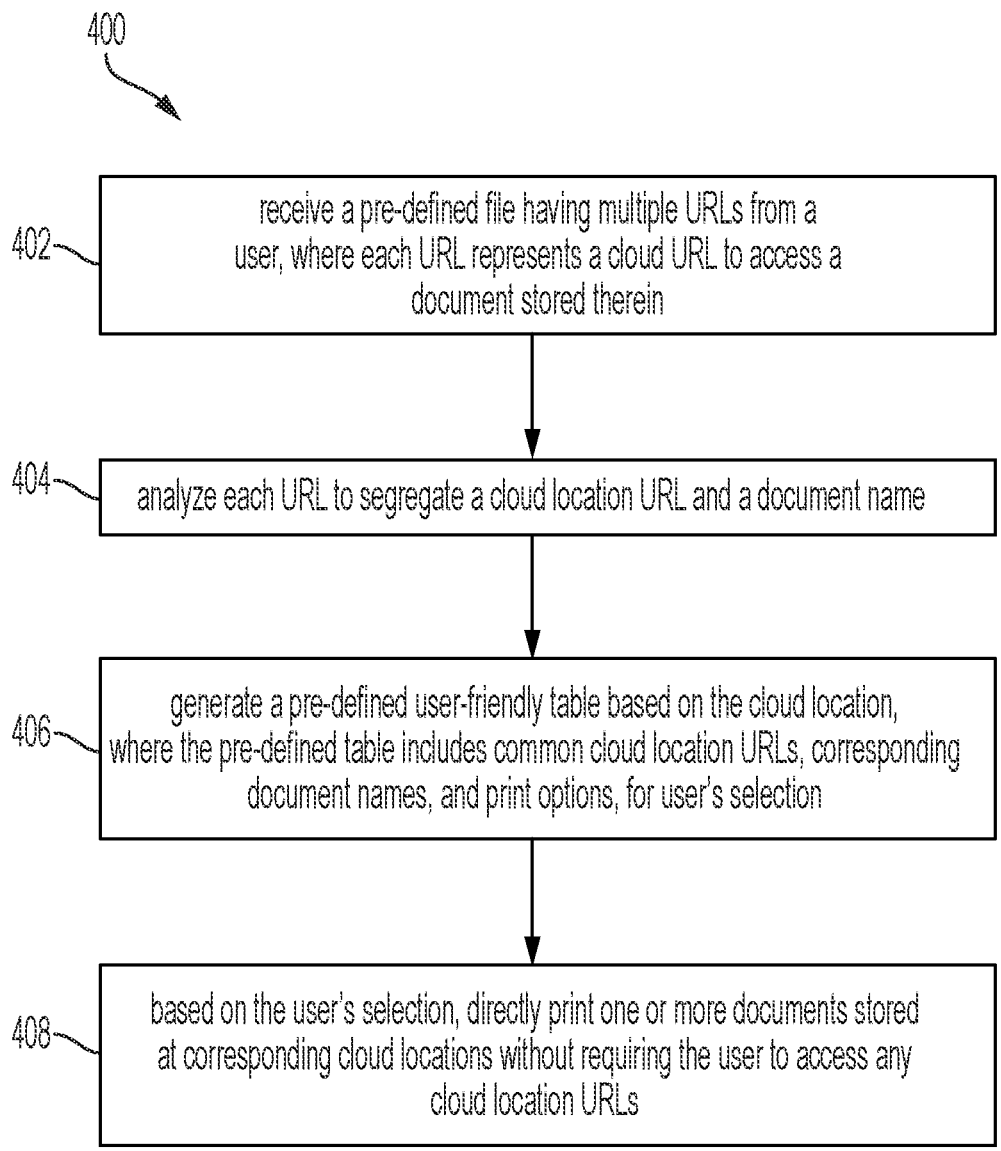
FIG. 4 is a method flowchart for printing multiple documents stored at multiple different cloud locations, in accordance with an embodiment of the present disclosure.

FIG. 4 is a method flowchart 400 for allowing a user to directly print multiple documents stored at multiple and/or different cloud locations. The method 400 may be implemented by the multi-function device 102 or 200 as shown in FIGS. 1A-2A. The method 400 may be implemented by the system 110 and 220, where processing of URLs, generation of the user-friendly view or the like is performed at the computing device (112 or 222) and printing is done at the multi-function device (116 or 228).

The method 400 begins when a user wishes to print multiple documents stored at multiple and/or different cloud locations without requiring him to access URL or cloud locations. The user gathers all URLs in a pre-defined file such as text file and submits it to a multi-function device such as 102 for processing. The user may submit the pre-defined file to another device such as a computing device. For easy understanding, the method 400 is discussed where the pre-defined file is directly submitted at a multi-function device such 102 for further processing.

At 402 the pre-defined file having multiple URLs is received from the user. Each URL represents a cloud URL which is typically accessed to retrieve a document stored at respective cloud location. Once received, the pre-defined file is stored for further processing.

Then, each URL included in the pre-defined file is analyzed at 404. In particular, each URL is analyzed to segregate into a cloud location URL and a document name. The, all the cloud location URLs are further analyzed to identify one or more common cloud location URLs.

At 406, a pre-defined user-friendly view is generated based on the common cloud location URLs. The pre-defined user-friendly view includes at least: common cloud location URLs, corresponding document details such as document names, and print options. The print options may include 'print all' option and print option provided against each of the common cloud location URL. The pre-defined user-friendly view is generated to provide a simple view of various common cloud locations, documents stored at those locations, and to provide various print options for easy and direct printing by the user. After this, the user-friendly view is displayed/presented to the user via a user interface for user's selection. The user can select document names for printing and can select any print options provided for printing the documents. The user can select any number of document names or any print options for printing. Based on the user's selection, corresponding cloud locations are accessed and then the documents are identified based on the document names. Once identified, the documents are retrieved or temporarily downloaded at the multi-function device from the cloud location for printing. For example, if the user selects a document name, then a cloud location URL as given in pre-defined view is accessed, where the cloud location may have many other documents. The document selected by the user is searched based on the document name such as 'ab.pdf or ab', and once identified, the document 'ab' is downloaded and printed. In another example, if the user selects 'print all' options then all cloud URLs provided in the pre-defined view are accessed and the corresponding documents are searched by their document names. Once searched, the documents are temporarily downloaded at the multi-function device for printing.

Finally, at 408, based on the user's selection, one or more documents retrieved from the corresponding cloud locations are printed without requiring the user to manually access any cloud location URLs. Once the documents are printed, the documents may be automatically deleted from the temporary location. Alternatively, the document may remain in the temporary location for later use. In the latter scenario, the documents can be automatically deleted after some time.

Additionally, the method 400 can be implemented in the form of a non-transitory computer-readable medium including instructions executable by a processing resource For example, the processing resource receives a pre-defined file from a user, comprising multiple URLs, wherein each URL represents a cloud URL for accessing a corresponding document as stored, analyzes each URL to segregate a cloud location URL and a document name, generates a pre-defined user-friendly view based on the cloud locations, wherein the pre-defined user-friendly view comprising common cloud URLs, corresponding document names, and print options, for user's selection; and based on the user's selection, directly prints one or more documents stored at corresponding cloud locations without requiring the user to access any cloud location URLs.

The present disclosure discloses methods and systems for allowing a user to directly print multiple documents stored at multiple and/or different cloud locations such that the user is not required to manually access any cloud location or URL. As a result, a lot of time and effort of the user is saved. The methods and systems provide a view with multiple options for printing, where the user can be select any options for printing. The methods and systems provide a simple and user friendly way of printing documents stored over multiple and/or different cloud locations and further reduces printing workflow steps. The methods and systems automatically fetch the selected documents from the respective cloud locations, therefore, the user is not required to visit individual cloud location URLs to select and print the documents.

The disclosure can be implemented by anyone such as organization, individual users, and so on. For example, the disclosure can be implemented when a user wishes to print five chapters of a book that are stored by its authors at five different cloud locations. In such cases, the user can simply provide a file with the cloud URLs for the five chapters and can print all the chapters in a single request, without accessing the URLs. In another example, the disclosure can be implemented when a user receives multiple URLs for multiple documents from another user and wishes to print one or more or all documents. The user can simply gather all cloud URLs in the file and submit the same at the multi-function device. The user can select any document or all documents for printing.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, generating, storing, displaying, presenting, retrieving, downloading, printing, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for printing multiple documents stored over multiple different cloud locations, the method comprising:
   receiving a pre-defined file comprising multiple URLs, wherein each URL represents a cloud location URL for accessing a corresponding document as stored;
   analyzing each URL to segregate a cloud location URL and a document name;
   generating a downloadable pre-defined user-friendly view based on the cloud locations,
   wherein the downloadable pre-defined user-friendly view comprises one or more groups of common cloud location URLs, corresponding selectable document names associated with each of the one or more groups of common cloud location URLs and the corresponding documents stored therein, and print options for selection, and wherein the print options comprise:
- a print option corresponding to each of the one or more groups of common cloud location URLs for printing one or more selectable documents stored over a corresponding common cloud location URL; and
- a print all option for printing all documents stored over one or multiple different cloud location URLs; and
- based on the selection of print options, directly printing one or more documents stored at corresponding cloud locations without requiring a user to access any cloud location URLs.

2. The method of claim 1, further comprising identifying a common cloud location URL of the segregated cloud location URLs.

3. The method of claim 1, wherein the selection comprises at least selection of one or more document names and print options, for printing.

4. The method of claim 1, wherein the print options comprise an option to directly print a specific document associated with the one or more groups of common cloud location URLs by selection of a corresponding document name associated with one of the one or more groups of common cloud location URLs.

5. The method of claim 1, further comprising, automatically accessing the cloud location URL to obtain the corresponding document based on the selection.

6. The method of claim 1, further comprising, searching for the corresponding document based on the selection.

7. The method of claim 1, further comprising, temporarily storing each corresponding document for printing.

8. The method of claim 1, further comprising, presenting the downloadable pre-defined user-friendly view comprising common cloud location URLs, corresponding document names, and print options, via a user interface in a pre-defined order.

9. A multi-function device for printing multiple documents stored over multiple different cloud locations, the multi-function device comprising:
- a URL manager configured to:
  - receive a pre-defined file comprising multiple URLs, wherein each URL represents a cloud URL to access a corresponding document as stored;
  - analyze each URL to segregate a cloud location URL and a document name;
  - generate a downloadable pre-defined user-friendly view based on the cloud locations, wherein the downloadable pre-defined view comprises one or more groups of common cloud location URLs, corresponding selectable document names associated with each of the one or more groups of common cloud location URLs and the corresponding documents stored therein, and print options for selection,
  - wherein the print options comprise:
    - a print option corresponding to each of the one or more groups of common cloud location URLs for printing one or more selectable documents stored over corresponding common cloud location URL; and
    - a print all option for printing all documents stored over one or multiple different cloud location URLs; and
- a print engine configure to, based on the selection of print options, directly print one or more documents stored at corresponding cloud locations without requiring a user to access any cloud location URLs.

10. The multi-function device of claim 9, wherein the URL manager is configured to identify a common cloud location URL of the segregated cloud location URLs.

11. The multi-function device of claim 9, wherein the selection comprises at least selection of one or more document names and print options, for printing.

12. The multi-function device of claim 9, wherein the URL manager is configured to automatically access the cloud location URL to obtain the corresponding document based on the selection.

13. The multi-function device of claim 9, wherein the URL manager is configured to search for the corresponding document based on the selection.

14. A system for handling multiple URLs, the system comprising:
- a URL manager application running on a computing device, the URL manager application configured to:
  - receive a pre-defined file comprising multiple URLs associated with multiple different cloud locations, wherein each URL represents a cloud location URL to access a corresponding document as stored;
  - analyze each URL to segregate a cloud location URL and a document name;
  - generate a downloadable pre-defined user-friendly view based on the cloud location URLs, wherein the downloadable user-friendly view comprises one or more groups of common cloud location URLs, corresponding selectable document names associated with each of the one or more groups of common cloud location URLs and the corresponding documents stored therein, and print options for selection,
  - wherein the print options comprise:
    - a print option corresponding to each of the one or more groups of common cloud location URLs for printing one or more selectable documents stored over a corresponding common cloud location URL; and
    - a print all option for printing all documents stored over one or multiple different cloud location URLs; and
- a printer communicatively coupled to the computing device, the printer configured to, based on the selection of print options, directly print one or more documents stored at corresponding cloud location URLs without requiring a user to access any cloud location URLs.

15. The system of claim 14, wherein the selection comprises at least selection of one or more document names and print options, for printing.

16. A method for printing multiple documents stored over multiple and/or different cloud locations, the method comprising:
- receiving a pre-defined file, comprising multiple URLs, wherein each URL represents a cloud location URL for accessing a corresponding document as stored;
- analyzing each URL to segregate a cloud location URL and a document name;
- generating a downloadable pre-defined user-friendly view based on the cloud location URLs, wherein the downloadable pre-defined user-friendly view comprises one or more groups of common cloud location URLs, corresponding selectable document names associated with each of the one or more groups of common cloud location URLs, and print options for selection,
- wherein the print options comprise:
  - a first print option corresponding to directly printing a specific document associated with the one or more groups of common cloud location URLs by selection of a corresponding document name associated with one of the one or more groups of common cloud location URLs;

a second print option corresponding to each of the one or more groups of common cloud location URLs for printing one or more selectable documents stored over corresponding common cloud location URL;

a third print option corresponding to a print all option for printing all documents stored over one or multiple and/or different cloud location URLs; and based on the selection of print options, directly printing one or more documents stored at corresponding cloud location URLs without requiring a user to access any cloud location URLs.

17. The method of claim 16, further comprising identifying a common cloud location URL of the segregated cloud location URLs.

18. The method of claim 16, wherein the selection comprises at least selection of one or more document names and print options, for printing.

19. The method of claim 16, further comprising, automatically accessing the cloud location URL to obtain the corresponding document based on the selection.

20. The method of claim 16, further comprising, presenting the downloadable pre-defined user-friendly view comprising common cloud URLs, corresponding document names, and print options, via a user interface in a pre-defined order.

* * * * *